Patented Dec. 18, 1934

1,984,922

UNITED STATES PATENT OFFICE 1,984,922

COMPOSITION MATERIAL

Wallace C. Fischer, Chicago, Ill.

No Drawing. Application October 6, 1930,
Serial No. 486,741

16 Claims. (Cl. 91—68)

This invention relates to the manufacture of plastic material which is adapted to be molded or otherwise formed in sheets, blocks or the like, or applied to foundation elements. It particularly pertains to plastic material for the manufacture of constructional materials, such as roofing, tiles, planks, expansion joint, rail filler, flooring crack fillers, and the like.

The invention consists in the features, combinations, and compositions hereinafter described or claimed, for carrying out the above stated object and such other objects as will hereinafter appear in describing certain specific embodiments which typify the invention.

In the manufacture of various constructional materials, such as those above specified, I contemplate producing plastic material which is waterproof, durable, and of stone-like character, yet not brittle. It may be compounded in various colors by proper selections of fillers or pigments incorporated in the mixture or applied to the surface of a formed sheet.

The invention may be typified by a composition in which a base of crude unvulcanized rubber is first prepared by softening same in a suitable oil, such as petroleum oil, kerosene or a light lubricating oil. In softening the rubber absorbs a large quantity of oil, about twice its weight or more. Thereafter the rubber and oil mixture is mixed with resinous material, such as pine resin, in the presence of heat to knead and thoroughly intermix the elements into a homogeneous mass, or a polymerized oil may be used. To give the mass a consistency at which same will penetrate a foundation felt, it may be thinned with a suitable solvent, such as raw or boiled linseed oil or naphtha. Where the composition is thinned with a solvent and prepared as a saturating medium for felts, it may be conveniently referred to as a saturating composition, as distinct from a "coating composition" in which an inert filler, such as kieselguhr, clay, whiting, barium sulphate or other neutral white pigments, is employed to give a thick consistency. As much as seventy-five (75%) per cent or eighty (80%) per cent of inert filler material may be included to produce a hard, dense coating. The density of the coating may be determined by varying the proportion of inert material.

My invention aims to saturate a foundation felt with the saturating composition and then coat the saturated sheet with the coating composition to produce a novel and improved roofing or floor sheet, wound into rolls or divided into shingle units or various designs and shapes. In lieu of saturating a felt foundation with the saturating composition, it may first be saturated with a bituminous composition, and then the bituminous saturated sheet coated with my coating composition. Or a conventional "asphalt roofing" saturated and coated with bituminous compositions may be coated with my coating composition.

The coating composition produced from the above specified inert material is of a gray color, thereby giving a stone-like appearance to the roofing sheet on which same is applied. It will be understood, however, that different colored inert material may be used to produce various colors. Where it is desired to have the coating composition softer and less dense, a much smaller proportion of inert filler may be used, so that granulated stone, slate or the like may be partially embedded therein. Or a proportion of the filler, especially that which is to effect the desired color, is localized at the exposed surface rather than mixed throughout the body of the mass. Such a modification is especially suitable for floors, running boards, walks or the like, which are to be subjected to traffic.

When a reenforcing sheet is not employed as a foundation sheet to which the composition is applied as a coating, but the composition is formed from the mass into sheets, slabs, or other articles of manufacture, fibrous material may be advantageously included and distributed therethrough to bond the elements of the composition into a stronger cohesive mass. Suitable fibrous material is asbestos fibres, cotton fibres, sawdust and the like.

In preparing the composition for the manufacture of stone-like products such as shingles, tile, and the like, limestone dust is especially suitable as a filler. The dust is very fine, thereby permitting a large quantity of it to be mixed with the rubber-rosin base. The base is heated and stirred while the limestone dust is incorporated therein in small quantities at a time. With the limestone dust, a very small quantity of pigment is needed to give color to the composition. Granite dust, slate dust, brick dust, flue dust, ground cement and the like may be used with or in lieu of the limestone dust. By pressing the mass over a glazed forming device, smooth and highly polished surfaces may be obtained. A smooth, polished surface is particularly desired for flooring, walltile, wallboard, and the like.

While I have described the foregoing in reference to pressed sheets, slabs or other molded articles, it will be understood that the plastic material may be poured in place on the job. For mastic floors, roofing cements, filling joints in paving and building structures, the material may be spread or trowelled in place. By reheating to about 110° C. or by means of a solvent, the material may be dissolved to a plastic condition in which it may be poured and trowelled. Slow drying oils, such as castor oil, linseed oil, and the like, may be used in the composition to prolong setting.

The composition is especially useful for filling cracks, crevices and the like around the mop boards of rooms, and may be prepared in various colors to match the surrounding wood work.

Another aspect of the invention is that the composition may be chilled soon after mixing and powdered so that it may be shipped and applied in place in powdered form. By application of heat or by tamping the powdered granules may be compacted again into a dense cohesive mass. Or the powdered material may be mixed with a small amount of water to prevent any cohesion or compacting of the granules during shipment. Moreover, the water would also permit flowing the material into place, after which the water would escape, leaving the particles as a residue.

By heating the composition sufficiently high and incorporating a rubber accelerator therein, vulcanization may be effected as the rubber is well distributed throughout the mass.

In the above described embodiment ground cork, rubber, sawdust, or the like may be included with the inert filler. These are elastic and provide elasticity where it is not desired to produce a dense, stone-like product.

It will be understood that various changes may be made in the described composition, and that the proportions may be extensively changed without departing from the spirit of the invention.

This material may likewise be prepared in its original state and a light inert filler added thereto, after which the mass is emulsified either by a soap method or a clay method, and the material then can be poured in liquid form without preheating into crevices and cracks.

I claim:

1. A composition sheet comprising a bituminized fibrous foundation coated with an adhesive composition including rubber, resinous material and an inert filler.

2. A composition sheet comprising a waterproofed fibrous foundation coated with an adhesive composition including rubber, resin and an inert filler.

3. A composition sheet comprising a fibrous foundation saturated and coated with resinous material, and superposed with a surfacing composition including rubber, resin, and an inert filler.

4. A composition sheet comprising a fibrous foundation coated with an adhesive composition including rubber, resin, and an inert filler, and a surface layer of granular material adhered to the coating.

5. A composition sheet comprising a fibrous foundation coated with an adhesive composition including rubber, resin and an inert filler, which is applied thereto and vulcanized.

6. A method for producing composition sheet material comprising dissolving rubber and resin with a petroleum oil, incorporating finely ground inert material in the solution while in a heated condition, and applying the mixed mass to a waterproofed fibrous foundation.

7. A method for producing composition sheet material comprising dissolving rubber and resin in a suitable solvent, feeding a quantity of finely divided filling material to the solution, stirring the mixture to thoroughly mix the elements, applying a layer of the mixed mass to a waterproofed foundation, and vulcanizing the layer to the foundation.

8. A method for producing composition sheet material comprising dissolving rubber and resin with a petroleum oil, mixing finely divided inert material with the solution in a heated condition while stirring, chilling the mixed mass, and thereafter reducing the mixed mass to a granular condition, mixing the granules with water, and applying the mass to a foundation sheet.

9. A method for producing composition sheet material comprising dissolving rubber and resin in a petroleum oil, mixing finely divided inert material with the solution in a heated condition while stirring, adding clay and water thereto in sufficient quantity to form an emulsion, thoroughly mixing the mass, and applying the mass to a foundation sheet.

10. A method for producing composition sheet material comprising dissolving rubber and resin in a petroleum oil, mixing finely divided inert material with the solution in a heated condition while stirring, adding soap and water thereto in sufficient quantity to form an emulsion and thoroughly mixing the mass.

11. A method of producing composition sheet material comprising saturating a fibrous foundation with a solution of rubber and resinous material, and coating the saturated foundation with a coating mixture of rubber, resinous material, and an inert filler.

12. A method of producing composition sheet material comprising waterproofing a fibrous foundation, coating the waterproofed foundation with a coating mixture of rubber, resinous material and inert filler.

13. A method of producing composition sheet material comprising waterproofing a fibrous foundation, coating the waterproofed foundation with a coating mixture of rubber, resinous material and inert filler, said inert filler being localized at the exposed surface of the coating.

14. A composition sheet comprising a fibrous foundation saturated with a solution of rubber and resin and coated with a mixture of rubber, rosin material and inert filler.

15. A composition sheet comprising a fibrous foundation saturated with a waterproofing medium, and coated with a mixture of rubber, rosin material and inert filler.

16. A composition sheet comprising a fibrous foundation saturated with a waterproofing medium, and coated with a mixture of rubber, rosin material and inert filler, said inert filler being localized at the exposed surface of the coating.

WALLACE C. FISCHER.